US011751236B2

(12) United States Patent
Yan

(10) Patent No.: US 11,751,236 B2
(45) Date of Patent: Sep. 5, 2023

(54) BWP ALLOCATION METHOD AND APPARATUS

(71) Applicant: HUAWEI TECHNOLOGIES CO., LTD., Guangdong (CN)

(72) Inventor: Haidong Yan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 157 days.

(21) Appl. No.: 17/244,108

(22) Filed: Apr. 29, 2021

(65) Prior Publication Data

US 2021/0266920 A1    Aug. 26, 2021

Related U.S. Application Data

(63) Continuation of application No. PCT/CN2019/114436, filed on Oct. 30, 2019.

(30) Foreign Application Priority Data

Oct. 31, 2018 (CN) .......................... 201811290224.5

(51) Int. Cl.
H04W 4/00 (2018.01)
H04W 72/56 (2023.01)
H04W 72/52 (2023.01)

(52) U.S. Cl.
CPC ........... *H04W 72/56* (2023.01); *H04W 72/52* (2023.01)

(58) Field of Classification Search
CPC . H04W 72/10; H04W 72/0486; H04W 36/22; H04W 52/0212; H04W 72/0453; H04W 72/042; Y02D 30/70
USPC ......................................... 370/329, 330, 328
See application file for complete search history.

(56) References Cited

U.S. PATENT DOCUMENTS

| 9,088,988 | B1 | 7/2015 | Park et al. |
| 2011/0141999 | A1 | 6/2011 | Karlsson et al. |
| 2011/0237238 | A1 | 9/2011 | Hassan et al. |
| 2015/0063259 | A1 | 3/2015 | Gohari et al. |
| 2016/0119846 | A1 | 4/2016 | Chou et al. |
| 2019/0104543 | A1* | 4/2019 | Park ........................ H04L 1/001 |
| 2021/0314987 | A1* | 10/2021 | Ericson ............. H04W 72/0453 |

(Continued)

FOREIGN PATENT DOCUMENTS

| CN | 107493605 A | 12/2017 |
| CN | 108352974 A | 7/2018 |

(Continued)

OTHER PUBLICATIONS

Huawei, HiSilicon, Discussion on BWP operation for NR-U 3GPP TSG-RAN WG2 Meeting #103, Gothenburg, Sweden, Aug. 20-24, 2018, R2-1811939, 3 pages.

(Continued)

*Primary Examiner* — Chuong T Ho
(74) *Attorney, Agent, or Firm* — WOMBLE BOND DICKINSON (US) LLP

(57) ABSTRACT

Embodiments of this application provide a bandwidth part (BWP) allocation method and an apparatus, and relate to the communications field. The method includes: A base station may implement dynamic BWP allocation based on information such as terminal status information and/or a BWP usage status, so that a flexible and reliable BWP allocation manner is provided, to improve resource utilization.

20 Claims, 9 Drawing Sheets

(56) References Cited

U.S. PATENT DOCUMENTS

2021/0352723 A1* 11/2021 Ye .................. H04W 74/008
2022/0039096 A1* 2/2022 Wang ................ H04B 17/318

FOREIGN PATENT DOCUMENTS

WO          2010010009 A2    1/2010
WO          2018171413 A1    9/2018

OTHER PUBLICATIONS

3GPP TS 38.300 V15.3.1 (Oct. 2018), 3rd Generation Partnership Project; Technical Specification Group Radio Access Network; NR; NR and NG-RAN Overall Description; Stage 2(Release 15), 92 pages.

Huawei, HiSilicon, Further discussion on BWP switching. 3GPP TSG-RAN WG4-AH-1807 , Montreal, Canada, Jul. 2-6, 2018, R4-1809068, 3 pages.

* cited by examiner

BWP ALLOCATION METHOD AND APPARATUS

CROSS-REFERENCE TO RELATED APPLICATIONS

This application is a continuation of International Application No. PCT/CN2019/114436, filed on Oct. 30, 2019, which claims priority to Chinese Patent Application No. 201811290224.5, filed on Oct. 31, 2018. The disclosures of the aforementioned applications are hereby incorporated by reference in their entireties.

TECHNICAL FIELD

Embodiments of this application relate to the communications field, and in particular, to a BWP allocation method and an apparatus.

BACKGROUND

In a fifth-generation (5G) mobile communications system, the 3rd generation partnership project (3GPP) redefines a new spectrum resource available for an operator and a corresponding bandwidth size. For example, a maximum of 400 MHz is used in a frequency band of 28 GHz. In this case, a prominent feature of a cell of a mobile communications system deployed by a 5G operator is that a network side can run in a high-bandwidth carrier cell, thereby increasing a peak rate of a system. For example, a high-bandwidth cell with a 400 MHz bandwidth resource may be deployed for a network-side base station.

However, in a current scenario of a high-bandwidth communications system, a higher maximum bandwidth supported by a terminal results in higher costs. Therefore, considering costs, a manufacturer currently may manufacture a terminal that supports a maximum bandwidth lower than a high bandwidth. In addition, after a high-bandwidth terminal accesses a cell, due to different types of services to be processed, when a service volume is comparatively small, an actual bandwidth used by the terminal may be far lower than a bandwidth currently available for the terminal, thereby causing a waste of resources.

Therefore, how to enable a terminal with a small bandwidth capability to access a high-bandwidth network to normally perform a service, and how to enable a terminal with a large bandwidth capability to dynamically adjust an operating bandwidth size of the terminal based on an actual service volume of the terminal to save power become issues that urgently need to be addressed.

To meet different requirements of a terminal for a bandwidth that the terminal needs to support or operate on, the fifth-generation mobile communications system proposes a concept mechanism of a bandwidth part (BWP) to cope with a difference between the requirements of the terminal.

However, a BWP mechanism in the prior art is imperfect and has the following problems: unicity and insufficient flexibility of a bandwidth resource allocation manner, low resource utilization, and incapability of coping with current diversified application scenarios.

SUMMARY

This application provides a BWP allocation method and an apparatus, to avoid low resource utilization due to unicity of an allocation manner to some extent.

To achieve the foregoing objective, the following technical solutions are used in this application.

According to a first aspect, an embodiment of this application provides a BWP allocation method. The method may include: A base station determines average bandwidth resource usage of one or more terminals accessing a first cell in a first time period. Then the base station may determine a size of a first BWP based on the average bandwidth resource usage. Then the base station sends, in the first time period, first indication information to a first terminal accessing the first cell, where the first indication information is used to indicate the first terminal to operate in the first BWP.

In the foregoing manner, the base station can dynamically and intelligently set the first BWP based on actual RB usage of a terminal in a cell, to achieve an optimal power saving effect, and further improve resource utilization.

In an embodiment, the first indication information is used to indicate the first terminal to operate in the first BWP when a switching condition is met, and the switching condition is that the first terminal has no service within preset duration or an average service volume within preset duration is less than a service volume threshold.

In the foregoing manner, when a terminal needs to switch to a power saving mode, the terminal can automatically switch to a BWP allocated by the base station to the terminal, to achieve an optimal power saving effect, and further improve resource utilization.

In an embodiment, the size of the first BWP is equal to the average bandwidth resource usage.

In the foregoing manner, the first BWP can be intelligently and dynamically adjusted, and appropriateness of the size of the first BWP in the power saving mode is improved.

According to a second aspect, an embodiment of this application provides a BWP allocation method. The method may include: A base station obtains status information of a terminal accessing a first cell, where the status information includes at least one of the following: speed information, delay spread information, and service type information. When the status information exceeds a status threshold, the base station sends first indication information to the terminal, where the first indication information is used to indicate the terminal to operate in a first BWP with first attribute information, and the first attribute information includes a subcarrier spacing SCS and a cyclic prefix CP.

In the foregoing manner, the base station can allocate an adaptive BWP to the terminal based on a current status of the terminal, to improve signal quality of the terminal, and further improve user experience.

In an embodiment, before the operation of obtaining, by a base station, status information of a terminal accessing a first cell, the method further includes: The base station obtains bandwidth information of the terminal, where the bandwidth information is used to indicate a maximum bandwidth supported by the terminal; divides a bandwidth resource of the first cell into at least two BWPs; and sends second indication information to the terminal, where the second indication information is used to indicate the terminal to operate in a second BWP, attribute information of the second BWP is the same as, different from, or partially the same as that of the first BWP, and both the first BWP and the second BWP belong to the at least two BWPs.

In the foregoing manner, in an initial division stage of allocating a BWP to the terminal, the base station can set BWPs with different attribute information, so that the base station can allocate an adaptive BWP to the terminal based on current status information of the terminal, to improve signal quality of the terminal and user experience.

In an embodiment, if the speed information exceeds a first status threshold, the SCS of the first BWP is greater than an SCS of the second BWP, and the first status threshold is included in the status threshold.

In the foregoing manner, the base station can adjust, based on a change of a speed status of the terminal, attribute information of a BWP in which the terminal operates.

In an embodiment, if the delay spread information exceeds a second status threshold, a length of the CP of the first BWP is greater than a length of a CP of the second BWP, and the second status threshold is included in the status threshold.

In the foregoing manner, the base station can adjust, based on a change of a delay spread status of the terminal, attribute information of a BWP in which the terminal operates.

In an embodiment, if the service type information exceeds a third status threshold, the SCS of the first BWP is greater than an SCS of the second BWP, and the third status threshold is included in the status threshold.

In the foregoing manner, the base station can adjust, based on a change of a service type status of the terminal, attribute information of a BWP in which the terminal operates.

In an embodiment, a starting location of the second BWP in the bandwidth resource of the first cell is different from a starting location, in a bandwidth resource of a second cell, of a BWP in which a terminal accessing the second cell operates.

According to a third aspect, an embodiment of this application provides a BWP allocation method. The method may include: A base station sends indication information to a first terminal, where the indication information is used to indicate the first terminal to operate in a first BWP. When load of the first BWP exceeds a load threshold, the base station may send second indication information to the first terminal, where the indication information is used to indicate the first terminal to operate in a second BWP, and load of the second BWP is less than that of the first BWP.

In the foregoing manner, the base station can allocate a BWP based on a load status of the BWP, thereby improving resource utilization of a bandwidth resource.

In an embodiment, load information may include a quantity of terminals operating in the first BWP and/or resource block RB usage of the first BWP.

In the foregoing manner, the base station can accurately obtain and promptly monitor a load status of a BWP.

In an embodiment, before the sending, by a base station, first indication information to a first terminal, the method further includes: The base station obtains bandwidth information of the first terminal. The bandwidth information is used to indicate a maximum bandwidth supported by the first terminal. The first BWP and the second BWP are less than or equal to the maximum bandwidth supported by the first terminal.

In the foregoing manner, the base station can properly allocate a corresponding BWP to a terminal based on a maximum bandwidth that can be actually supported by the terminal.

In an embodiment, the operation of sending, by the base station, second indication information to the first terminal may include: The base station determines a switching priority of one or more terminals operating in the first BWP. When a switching priority of the first terminal is lower than a priority threshold, the base station sends the second indication information to the first terminal.

In the foregoing manner, the base station can determine, based on a switching priority of a terminal operating in a BWP, a terminal that needs to be switched, thereby improving flexibility and reliability of BWP allocation.

In an embodiment, the switching priority is used to indicate bandwidth information of each terminal.

In the foregoing manner, the base station can determine, based on bandwidth information of a terminal, a terminal that needs to be switched, thereby improving flexibility and reliability of BWP allocation.

In an embodiment, the operation of sending, by the base station, second indication information to the first terminal may include: The base station determines average RB usage of the first terminal. When the average RB usage of the first terminal is less than an average RB usage threshold, the base station sends the second indication information to the first terminal.

In the foregoing manner, a terminal with low RB usage is preferentially adjusted onto another BWP, that is, the second BWP, to reduce a possible risk that an adjustment affects a load status of the second BWP.

In an embodiment, a starting location of the first BWP in a bandwidth resource of a first cell is different from a starting location, in a bandwidth resource of a second cell, of a BWP in which a terminal accessing the second cell operates.

In the foregoing manner, frequency-domain staggering is implemented between different cells served by a same base station, thereby reducing inter-cell interference and improving signal quality of a terminal.

The method in the first aspect, the second aspect, or the third aspect may be performed by a base station, or may be performed by a chip in a base station.

According to a fourth aspect, an embodiment of this application provides a communications apparatus. The communications apparatus includes a first determining module, a second determining module, and a sending module. The first determining module may be configured to determine average bandwidth resource usage of one or more terminals accessing a first cell in a first time period. The second determining module may be configured to determine a size of a first BWP based on the average bandwidth resource usage. The sending module may be configured to send, in the first time period, first indication information to a first terminal accessing the first cell, where the first indication information is used to indicate the first terminal to operate in the first BWP.

In an embodiment, the first indication information is used to indicate the first terminal to operate in the first BWP when a switching condition is met, and the switching condition is that the first terminal has no service within preset duration or an average service volume within preset duration is less than a service volume threshold.

In an embodiment, the size of the first BWP is equal to the average bandwidth resource usage.

According to a fifth aspect, an embodiment of this application provides a communications apparatus. The apparatus includes a first obtaining module and a first sending module. The first obtaining module may be configured to obtain status information of a terminal accessing a first cell, where the status information includes at least one of the following: speed information, delay spread information, and service type information. The first sending module may be configured to: when the status information exceeds a status threshold, send first indication information to the terminal, where the first indication information is used to indicate the terminal to operate in a first BWP with first attribute information, and the first attribute information includes a subcarrier spacing SCS and a cyclic prefix CP that are used to adjust signal quality of the terminal.

In an embodiment, the communications apparatus further includes: a second obtaining module, configured to obtain bandwidth information of the terminal, where the bandwidth information is used to indicate a maximum bandwidth supported by the terminal; a division module, configured to divide a bandwidth resource of the first cell into at least two BWPs; and a second sending module, configured to send second indication information to the terminal, where the second indication information is used to indicate the terminal to operate in a second BWP, attribute information of the second BWP is the same as, different from, or partially the same as that of the first BWP, and both the first BWP and the second BWP belong to the at least two BWPs.

In an embodiment, if the speed information exceeds a first status threshold, the SCS of the first BWP is greater than an SCS of the second BWP, and the first status threshold is included in the status threshold.

In an embodiment, if the delay spread information exceeds a second status threshold, a length of the CP of the first BWP is greater than a length of a CP of the second BWP, and the second status threshold is included in the status threshold.

In an embodiment, if the service type information exceeds a third status threshold, the SCS of the first BWP is greater than an SCS of the second BWP, and the third status threshold is included in the status threshold.

In an embodiment, a starting location of the second BWP in the bandwidth resource of the first cell is different from a starting location, in a bandwidth resource of a second cell, of a BWP in which a terminal accessing the second cell operates.

According to a sixth aspect, an embodiment of this application provides a communications apparatus. The communications apparatus includes a first sending module and a second sending module. The first sending module may be configured to send indication information to a first terminal, where the indication information is used to indicate the first terminal to operate in a first BWP. The second sending module may be configured to: when load of the first BWP exceeds a load threshold, send second indication information to the first terminal, where the indication information is used to indicate the first terminal to operate in a second BWP, and load of the second BWP is less than that of the first BWP.

In an embodiment, load information includes a quantity of terminals operating in the first BWP and/or resource block RB usage of the first BWP.

In an embodiment, the communications apparatus further includes an obtaining module, configured to obtain bandwidth information of the first terminal. The bandwidth information is used to indicate a maximum bandwidth supported by the first terminal. The first BWP and the second BWP are less than or equal to the maximum bandwidth supported by the first terminal.

In an embodiment, the second sending module is configured to: determine a switching priority of one or more terminals operating in the first BWP; and when a switching priority of the first terminal is lower than a priority threshold, send the second indication information to the first terminal.

In an embodiment, the switching priority is used to indicate bandwidth information of each terminal.

In an embodiment, the second sending module is configured to: determine average RB usage of the first terminal; and when the average RB usage of the first terminal is less than an average RB usage threshold, send the second indication information to the first terminal.

In an embodiment, a starting location of the first BWP in a bandwidth resource of a first cell is different from a starting location, in a bandwidth resource of a second cell, of a BWP in which a terminal accessing the second cell operates.

According to a seventh aspect, an embodiment of this application provides a base station, including a transceiver or a transmit pin and a receive pin, and a processor, and, further including a memory. The transceiver or the transmit pin and the receive pin, the processor, and the memory communicate with each other through an internal connection path. The processor is configured to execute an instruction to control the transceiver or the transmit pin and the receive pin to send or receive a signal. The memory is configured to store the instruction. When the processor executes the instruction, the processor performs the method in any one of the first aspect or the possible implementations of the first aspect, the method in any one of the second aspect or the possible implementations of the second aspect, and/or the method in any one of the third aspect or the possible implementations of the third aspect.

According to an eighth aspect, an embodiment of this application provides a computer-readable medium, configured to store a computer program. The computer program includes an instruction used to perform the method in any one of the first aspect or the possible implementations of the first aspect, any one of the second aspect or the possible implementations of the second aspect, and/or any one of the third aspect or the possible implementations of the third aspect.

According to a ninth aspect, an embodiment of this application provides a computer program. The computer program includes an instruction used to perform the method in any one of the first aspect or the possible implementations of the first aspect, any one of the second aspect or the possible implementations of the second aspect, and/or any one of the third aspect or the possible implementations of the third aspect.

According to a tenth aspect, an embodiment of this application provides a chip. The chip is disposed in a base station, and the chip may include a processing circuit, a transmit pin, and a receive pin. The transmit pin and the receive pin, and the processor communicate with each other through an internal connection path. The processor performs the method in any one of the first aspect or the possible implementations of the first aspect, the method in any one of the second aspect or the possible implementations of the second aspect, and/or the method in any one of the third aspect or the possible implementations of the third aspect, to control the receive pin to receive a signal, and control the transmit pin to send a signal.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, a first target object, a second target object, and the like are intended to distinguish between different target objects but do not indicate a particular order of the target objects.

In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary", "example", or the like is intended to present a related concept in a specific manner.

In the description of the embodiments of this application, unless otherwise stated, "multiple" means two or more than two. For example, a plurality of processing units mean at least two processing units, and a plurality of systems mean at least two systems.

Figure 1:
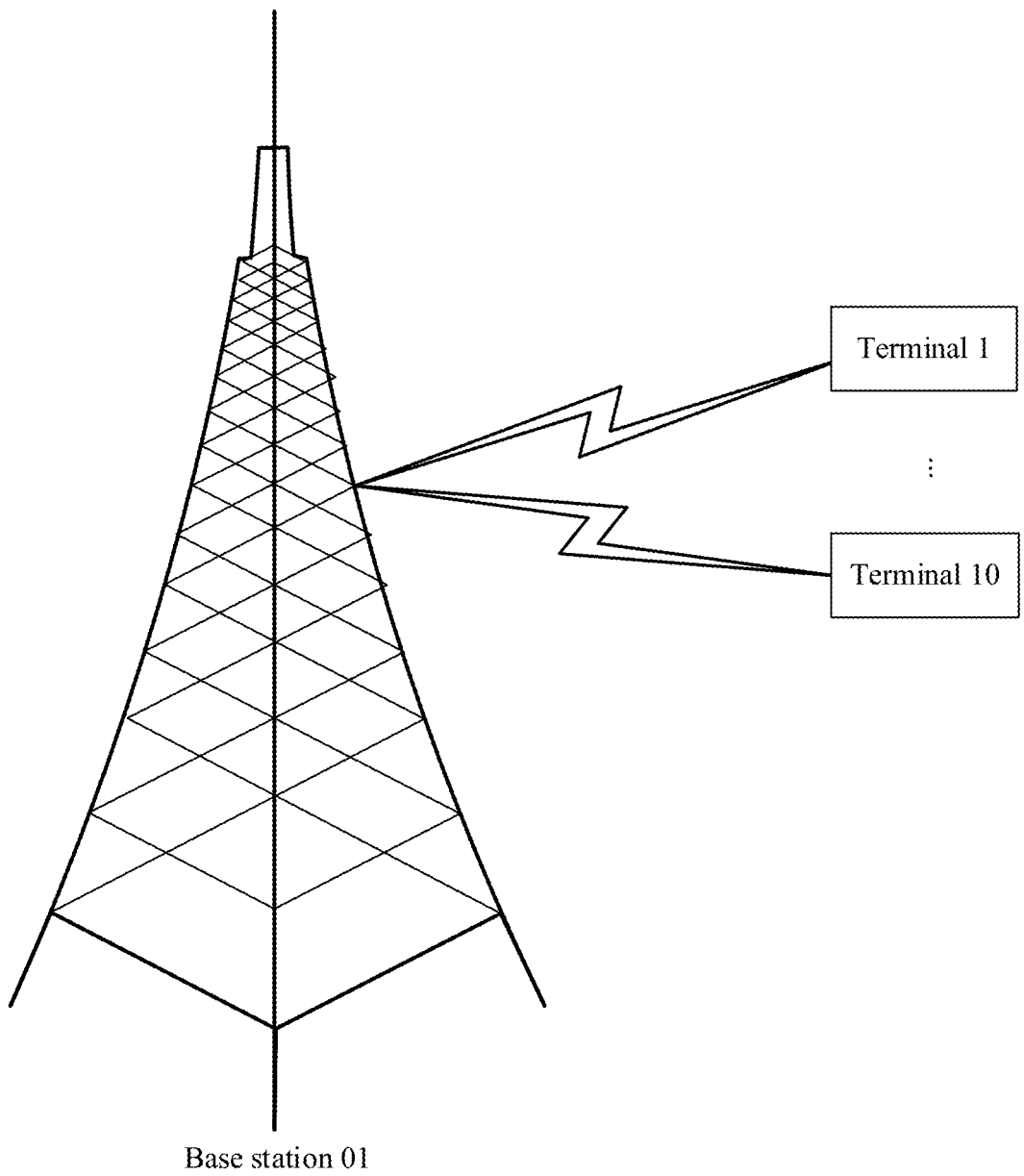
FIG. 1 is an architectural diagram of a communications system according to an embodiment of this application.

This application provides a communications system. The communications system includes a base station and a terminal. The base station and the terminal may wirelessly communicate with each other. FIG. 1 is a schematic architectural diagram of a communications system according to an embodiment of this application. As shown in FIG. 1, for example, the communications system includes a base station 01, a terminal 1, a terminal 2, a terminal 3, a terminal 4, a terminal 5, a terminal 6, a terminal 7, a terminal 8, a terminal 9, and a terminal 10 (the terminals 2 to 9 are not shown in the figure). The base station 01 may wirelessly communicate with the terminal 1, and the terminal 2 to the terminal 10 separately. It should be noted that the base station and the terminals included in the communications system shown in FIG. 1 are merely examples. In this embodiment of this application, a type and a quantity of network elements included in the communications system are not limited thereto.

The communications system may be a communications system supporting a fourth-generation (4G) access technology, for example, a long term evolution (LTE) access technology. Alternatively, the communications system may be a communications system supporting a (5G access technology, for example, a new radio (NR) access technology. Alternatively, the communications system may be a communications system supporting a third-generation (3G) access technology, for example, a universal mobile telecommunications system (UMTS) access technology. Alternatively, the communications system may be a communications system with a second-generation (2G) access technology, for example, a global system for mobile communications (GSM) access technology. Alternatively, the communications system may be a communications system supporting a plurality of wireless technologies, for example, a communications system supporting the LTE technology and the NR technology. In addition, the communications system is also applicable to a future-oriented communications technology.

In addition, the terminal in this embodiment of this application may be a device that provides voice or data connectivity for a user. For example, the terminal may also be referred to as user equipment (UE), a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet computer (pad), or the like.

The base station in this embodiment of this application is configured to support terminal access. For example, the base station may be a base transceiver station (BTS) or a base station controller (BSC) in the communications system with the 2G access technology, a NodeB (RNC) in the communications system with the 3G access technology, an evolved NodeB (eNB) in the communications system with the 4G access technology, or a next-generation NodeB (gNB) in the communications system with the 5G access technology.

To make a person skilled in the art better understand the technical solutions of this application, the following briefly describes a BWP allocation solution in the prior art.

Specifically, in the prior art, when a terminal with a small bandwidth capability accesses a high-bandwidth network, a base station selects a small segment of spectrum resource from a bandwidth resource based on a size of a maximum bandwidth supported by the terminal, and allocates the spectrum resource to the terminal with the small bandwidth capability (the bandwidth capability is the maximum bandwidth supported by the terminal), to ensure normal access and service requirements of the terminal. The low-bandwidth terminal can operate only in a BWP allocated to the terminal. For example, when a terminal with a bandwidth capability of 50 M accesses a 400 MHz cell, the base station selects a 50 MHz BWP from a 400 MHz bandwidth resource for the terminal to use.

It should be noted that, when the base station obtains, through division, a plurality of BWPs for the terminal, the terminal can activate only one BWP at one moment, that is, the terminal can operate only in one BWP at one moment, and an operating range of the terminal needs to be within a bandwidth range of the BWP. For example, a 50-M terminal accesses a 400-M high-bandwidth cell. In this case, a BWP allocated by the cell to the terminal is a 50-M part of the 400 M. Therefore, an operating bandwidth range of the terminal at a specific moment is only a part (50 M) of the 400 M, that is, a range of resource scheduling related to the terminal is limited to a range of 50 M.

To sum up, the BWP allocation method in the prior art has the following disadvantages:

(1) A bandwidth capability range of a terminal constitutes a limitation. To be specific, at one moment, the terminal can operate only within a frequency-domain bandwidth range of a BWP in which the terminal is located, and a current range based on user resource scheduling is also limited to the range of the BWP. For example, if a BWP allocated by a base station to a terminal is only 20 MHz (corresponding to 100 resource blocks (RB)), a user scheduling-based load balancing technology in a current cell can be used to perform scheduling only within a range of 20 MHz, that is, 100 RBs. This is far from achieving load balancing.

(2) For a terminal with a large bandwidth capability, when a power saving mechanism for a BWP is used, a comparatively small BWP with an appropriate size (that is, a power-saving BWP (default BWP)) needs to be selected for the terminal to save power when a service volume is comparatively small. However, in the prior art, because the default BWP is a fixed value, that is, the default BWP has been set during initial division of BWPs, the default BWP is possibly not applicable to all terminals. As a result, BWPs of some terminals are too small and cannot carry services being processed by the terminals.

To sum up, in the prior art, user experience is seriously affected due to unicity and insufficient flexibility of a bandwidth resource allocation manner, low resource utilization, and incapability of coping with current diversified application scenarios.

In view of the foregoing problems, an embodiment of this application provides a bandwidth part BWP-based resource allocation method, to improve flexibility of BWP allocation, resource utilization, and user experience.

Scenario 1

Figure 2:
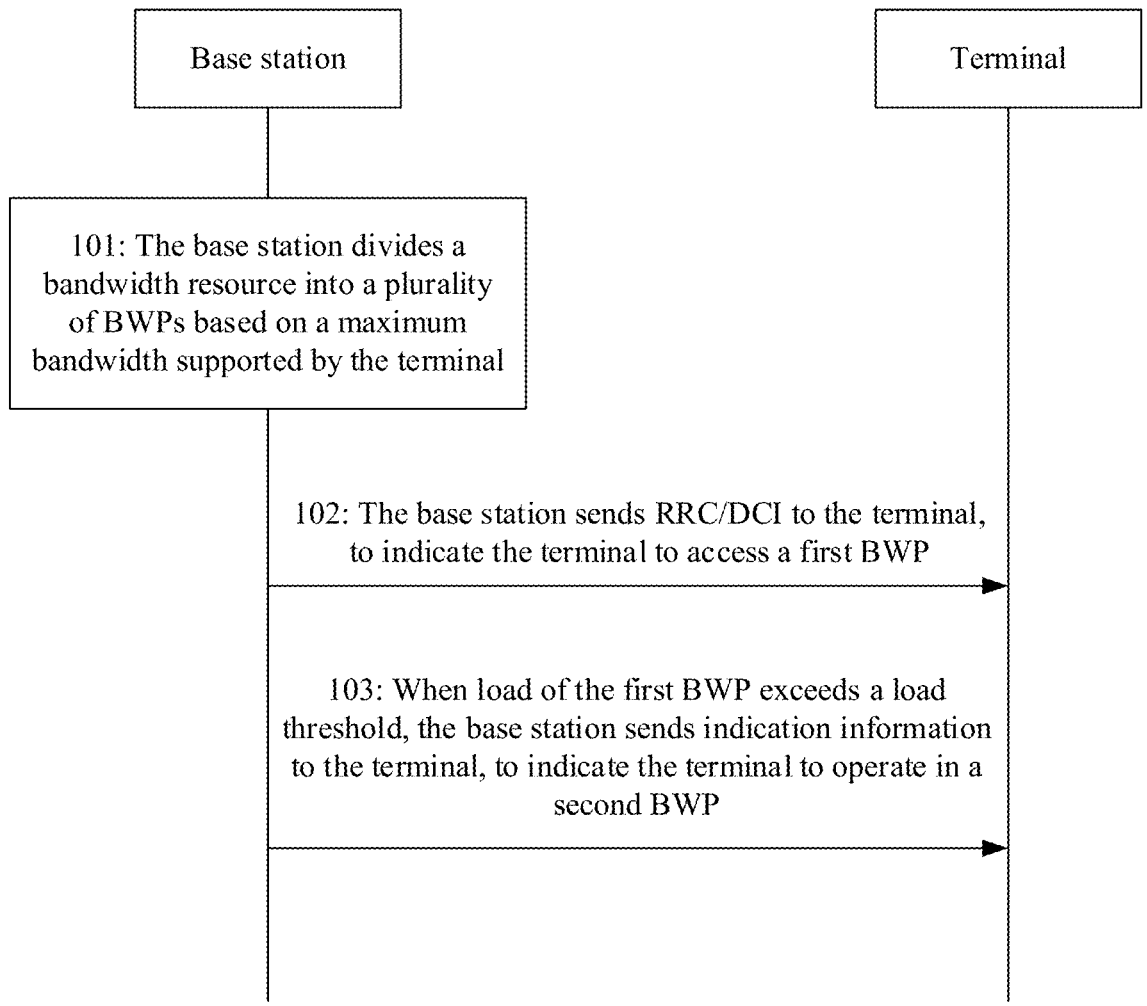
FIG. 2 is a schematic flowchart 1 of a BWP allocation method according to an embodiment of this application.

With reference to FIG. 1, FIG. 2 is a schematic flowchart of a BWP allocation method according to an embodiment of this application. FIG. 2 shows the following operations.

Operation 101: A base station divides a bandwidth resource into a plurality of BWPs (the plurality of BWPs are at least two BWPs) based on a maximum bandwidth supported by a terminal.

Specifically, in this embodiment of this application, an operation person may preset a BWP division rule on a base station side, and after the terminal accesses a cell, select a corresponding division rule based on a bandwidth capability supported by the terminal.

In this embodiment of this application, the base station may divide the bandwidth resource based on different bandwidth capabilities supported by the terminal (that is, bandwidth information used to indicate the maximum bandwidth supported by the terminal in this embodiment of this application). It should be noted that, currently, bandwidth capabilities of the terminal may be basically classified into 10 MHz, 20 MHz, 50 MHz, 100 MHz, 200 MHz, and the like, and the base station may pre-formulate a division rule based on different bandwidth capabilities and a current bandwidth resource of the cell.

For example, the base station may preset division rules. The division rules include but are not limited to: for a terminal supporting a bandwidth capability of 50 MHz, dividing a 100 MHz bandwidth resource into two BWPs, where each BWP corresponds to a 50 MHz bandwidth, and dividing a 200 MHz bandwidth resource into four BWPs, where each BWP corresponds to a 50 MHz bandwidth; for a terminal supporting a bandwidth capability of 100 MHz, dividing a 200 MHz bandwidth resource into two BWPs, where each BWP corresponds to a 100 MHz bandwidth. That is, corresponding division rules are preset for different bandwidth support capabilities and different bandwidth resources.

After the terminal accesses the cell, the base station obtains the maximum bandwidth supported by the terminal, and selects a corresponding division rule from the preset rules. For example, if a resource bandwidth of a current cell is 100 MHz and the maximum bandwidth supported by the terminal is 50 MHz, the base station searches a plurality of preset division rules, and determines that a division rule selected for the terminal is: dividing a 100 MHz bandwidth resource into two BWPs, where each BWP corresponds to a 50 MHz bandwidth.

It should be noted that, during division of the bandwidth resource, each BWP obtained through division does not need to be equal to a capability supported by the terminal, but a bandwidth resource of at least one BWP needs to be less than or equal to the maximum bandwidth supported by the terminal. Using a cell with a 100 MHz bandwidth resource as an example, if the bandwidth capability supported by the terminal is 50 MHz, the 100 MHz bandwidth resource may be divided into three BWPs. A BWP numbered 1 (in this application, after dividing the bandwidth resource, the base station sequentially numbers the BWPs, and in this embodiment and the following embodiments, a BWP numbered n is represented in a form of a BWP n, that is, the BWP numbered 1 is referred to as a BWP 1 below) corresponds to a bandwidth of 50 MHz, a BWP 2 corresponds to a bandwidth of 20 MHz, and a BWP 3 corresponds to a bandwidth of 30 MHz. A specific division form may be determined according to an actual requirement. This is not limited in this application.

Operation 102: The base station sends radio resource control (RRC)/downlink control information (DCI) to the terminal, to indicate the terminal to access a first BWP.

Specifically, the RRC/DCI may carry identification information of the first BWP, and the identification information may be a number of the first BWP.

In an embodiment, the base station may send an RRC/DCI message to the terminal, to indicate the terminal to operate in the first BWP. The first BWP may be a default BWP. For example, the first BWP may be a BWP numbered 1 (a BWP 1 for short), that is, a BWP ranked first according to a division order.

In this embodiment of this application, the base station may obtain load information of each BWP obtained through division. The load information includes but is not limited to information that can identify a load status of a BWP, for example, a terminal load quantity (that is, a quantity of terminals operating in each BWP) and/or RB usage. Then, the base station may select a BWP with lightest load based on the load information of each BWP, and send an RRC/DCI message to the terminal, so that the terminal operates in the BWP. It should be noted that the terminal load quantity is not directly related to the RB usage. To be specific, when the terminal load quantity is large, the RB usage is not necessarily high. On the contrary, when the RB usage is high, the terminal load quantity is not necessarily large. However, a person skilled in the art considers that an excessively large terminal load quantity may potentially affect the RB usage.

Operation 103: When load of the first BWP exceeds a load threshold, the base station sends indication information to the terminal, to indicate the terminal to operate in a second BWP.

Specifically, in this embodiment of this application, the base station may periodically obtain load information of each BWP. When load of at least one BWP exceeds the threshold, the base station sends an RRC/DCI message to at least one terminal corresponding to a BWP whose load exceeds the threshold, to indicate the at least one terminal to perform BWP switching, to be specific, indicate the at least one terminal to switch to a corresponding second BWP (second BWPs corresponding to the at least one terminal may be the same or different, and selection of the second BWP is described in detail in the following embodiment), so that the load of the at least one BWP whose load exceeds the threshold is restored to a normal state.

Figure 3:
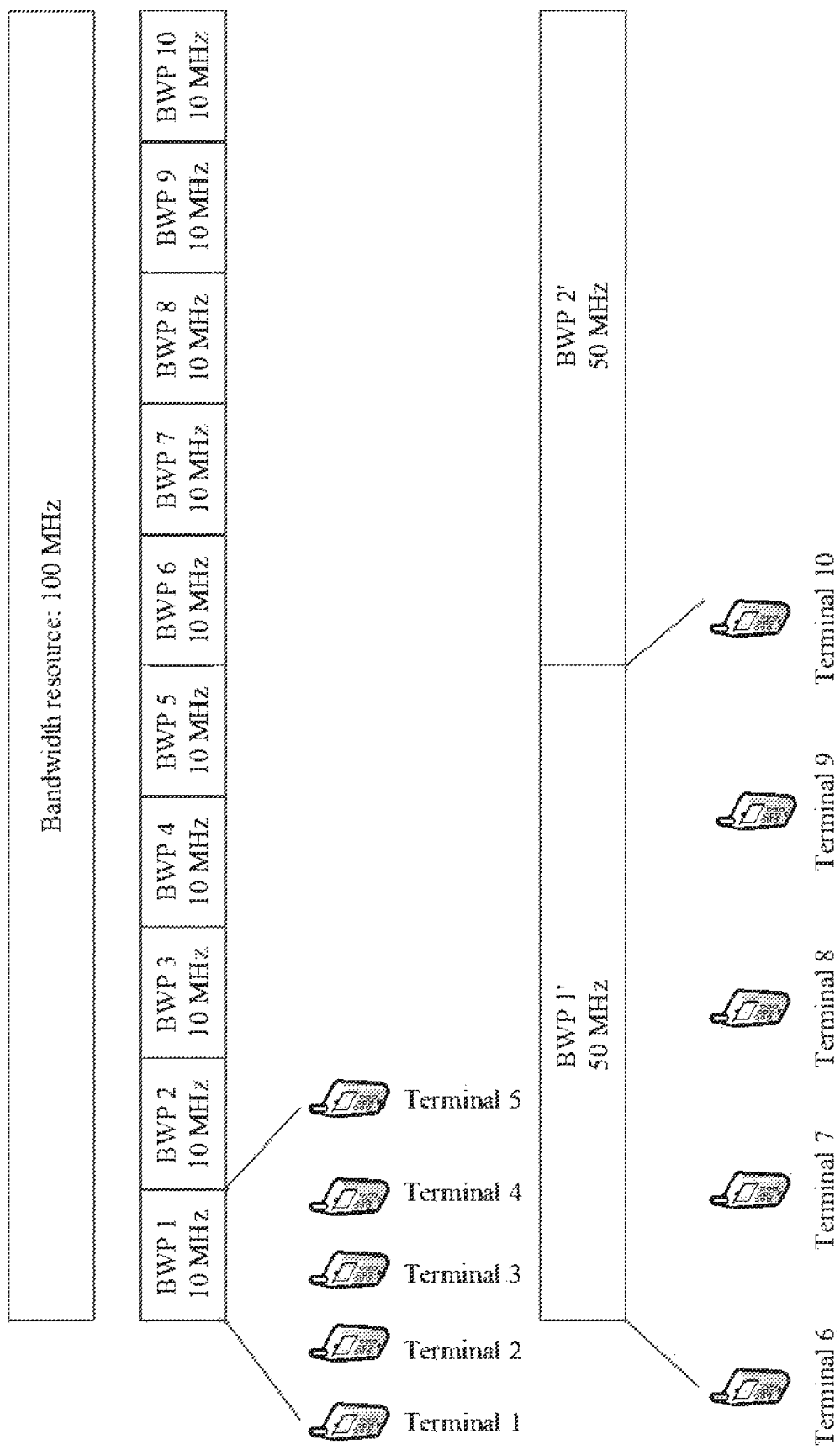
FIG. 3 is a schematic diagram of a load status of a BWP according to an embodiment of this application.

In an embodiment, the base station periodically obtains load information of each BWP. Because BWP division granularities are different, that is, bandwidths corresponding to BWPs are different, a load status shown in FIG. 3 may occur. Referring to FIG. 3, specifically, a bandwidth resource of a current cell is 100 MHz. Terminals 1 to 5 (a terminal 1, a terminal 2, a terminal 3, a terminal 4, and a terminal 5) all support a bandwidth capability of 10 MHz, and a bandwidth division status is as follows: The 100 MHz is divided into 10 BWPs, and each BWP corresponds to 10 MHz. The terminals 1 to 5 operate in a frequency domain in which a BWP 1 is located (because frequency domains are the same, BWPs in which the terminals 1 to 5 operate are all referred to as the BWP 1 below). Terminals 6 to 10 (a terminal 6, a terminal 7, a terminal 8, a terminal 9, and a terminal 10) all support a bandwidth capability of 50 MHz, and a bandwidth division status is as follows: The 100 MHz is divided into two BWPs, and each BWP corresponds to 50 MHz. The terminals 6 to 10 operate in a frequency domain in which a BWP 1 is located (for differentiation from the BWP 1 in which the terminals 1 to 5 operate, a BWP 1' is used herein for differentiation, and because frequency domains are the same, BWPs in which the terminals 6 to 10 operate are all referred to as the BWP 1' below). In this scenario, the BWP 1 and the BWP 1' have an overlapping portion in frequency domain. When a statistical period arrives, load information obtained by the base station in the BWP 1 (a manner of collecting statistics on load information of a BWP is detecting for a load status in a frequency domain to which the BWP belongs) is that a terminal load quantity is 10, load information of BWPs 2 to 5 is that a terminal load quantity is 5, load information of BWPs 3 to 10 is that a terminal load quantity is all 0, load information of the BWP 1' is that a terminal load quantity is 10, and a terminal load quantity of a BWP 2' is 0. Assuming that a current threshold corresponding to the user load quantity is 8, both the BWP 1 and the BWP 1' are overloaded currently. However, because bandwidth resources of the BWP 1 and the BWP 1' are different, for example, the terminals 6 to 10 may actually operate only in a first-half bandwidth of the BWP 1', if the terminal load quantity is used as an indicator for measuring a load status of a BWP, a load status description of a large-granularity BWP may be inaccurate. Therefore, for this case, in an embodiment, different thresholds corresponding to terminal load quantities may be set for BWPs with different granularity sizes. For example, for a BWP with a bandwidth of 10 MHz, a threshold of a terminal load quantity may be set to 8; for a BWP with a bandwidth of 50 MHz, a threshold of a terminal load quantity may be set to 20.

In this embodiment of this application, when a plurality of BWPs are all overloaded, the base station performs BWP switching for the terminal based on a load status of a BWP with a smallest granularity in the plurality of overloaded BWPs, to avoid a possible risk of overloading of the second BWP. For example, still using the scenario shown in FIG. 3 as an example, both the BWP 1 and the BWP 1' are overloaded. In this case, if two 50 MHz terminals in the BWP 1' are switched to the BWP 2', a load quantity of the BWPs 6 to 10 in a same frequency domain changes to 2; if two 10 MHz terminals in the BWP 1 are switched to the BWP 6, only a load quantity of the BWP 6 changes to 2, and a load quantity of the BWPs 7 to 10 does not change. Apparently, if a terminal in a small-granularity BWP is adjusted onto another BWP, impact on load of the another BWP is further reduced.

In this embodiment of this application, the following factor needs to be considered during BWP switching for the terminal: The second BWP is not overloaded after the terminal is switched to the second BWP. Based on this premise, when selecting a terminal to be adjusted, the base station may select, based on a switching priority of each terminal that operates in the first BWP (that is, an overloaded BWP), a terminal that needs to be switched. In an embodiment, the switching priority may be a size of a maximum bandwidth supported by the terminal. For example, the base station may preferentially select a terminal supporting a small bandwidth capability for switching (when the terminal with the small bandwidth capability is adjusted, impact on load of another BWP is small), thereby reducing a possible risk of overloading of the another BWP.

In another embodiment, the switching priority may be alternatively a service priority of a service processed by the terminal, that is, the base station may perform selection based on a priority of a service being processed by the terminal. For example, a priority of a voice service is comparatively high, and if a terminal of this type is switched, the voice service is interrupted. Therefore, the base station may select and switch a terminal to which another service with a lower priority than that of the voice service belongs.

In still another embodiment, the base station may select, based on actual RB usage of each terminal in an overloaded BWP, a terminal that needs to be adjusted. Specifically, the base station may collect statistics on average RB usage of each terminal in the overloaded BWP, and compare the average RB usage with an average RB usage threshold. If the average RB usage is less than the average RB usage threshold, it is determined that the terminal is an adjustable terminal. If there are a plurality of terminals whose average RB usage is less than the average RB usage threshold, the base station may determine, with reference to an actual overload status, for example, a quantity of overloaded terminals is 2, that two terminals need to be adjusted, and may select two terminals from the plurality of terminals whose average RB usage is less than the average RB usage threshold (any two terminals may be selected, or two terminals with lowest average RB usage may be selected, which is not limited in this application).

In this embodiment of this application, if BWP switching needs to be performed for a plurality of terminals (at least two terminals), second BWPs selected for the terminals may be the same or different. In an embodiment, a rule for selecting a second BWP may be: selecting a second BWP based on a load status of a BWP. Specifically, because load statuses of BWPs are different, the base station may preferentially select a BWP in a comparatively light load state as the second BWP, and indicate a terminal that needs to perform BWP switching to switch to the second BWP. For example, the base station selects the terminal 1 as a terminal that needs to be adjusted. A bandwidth capability of the terminal 1 is 10 MHz, and a resource of a current cell is 100 MHz. The terminal 1 originally operates in the BWP 1. The base station detects that a terminal load quantity of the BWPs 2 to 5 is 8, that in the BWPs 6 to 8 is 7, and that in the BWPs 9 and 10 is 4. In this case, the base station selects the BWP 9 as a second BWP for the terminal 1, and indicates the terminal 1 to switch to the BWP 9. In addition, if there are a plurality of terminals that need to be adjusted, in an embodiment, selection may be performed based on a size of a load status of a candidate BWP (the candidate BWP is a BWP that is in a light load state and that may be used as a second BWP). For example, the terminals that need to be adjusted are the terminal 1 and the terminal 2. In this case, the base station first adjusts the terminal 1 (it should be noted that the base station adjusts only one terminal each time). Still using the foregoing load status scenario as an example, candidate BWPs are the BWPs 9 and 10. The base station may select either of the candidate BWPs as a second BWP for the terminal 1. In this embodiment, the base station selects the BWP 9 as the second BWP for the terminal 1. Apparently, after the terminal 1 is adjusted, a load quantity of the BWP 9 changes to 5, and a load quantity of the BWP 10 is still 4. In this case, the base station may select the BWP 10 as a second BWP for the terminal 2. In this embodiment, the base station sequentially selects second BWPs for terminals, and the second BWPs are different. In an embodiment, a same BWP may be alternatively selected as a second BWP for the terminals that need to be adjusted. Specifically, the base station selects, based on a quantity of terminals that can be accepted by a BWP, a BWP that can serve as a second BWP. Still using the foregoing load status scenario as an example, when a threshold is 8, the BWP 9 and the BWP 10 each can accept four more terminals. In this case, the base station may use either of the BWP 9 and the BWP 10 as a second BWP for the terminal 1 and the terminal 2.

To sum up, in this embodiment of this application, a BWP in which a terminal operates is adjusted based on a load status of the BWP, to achieve load balancing between BWPs and improve resource utilization.

Scenario 2

Figure 4:
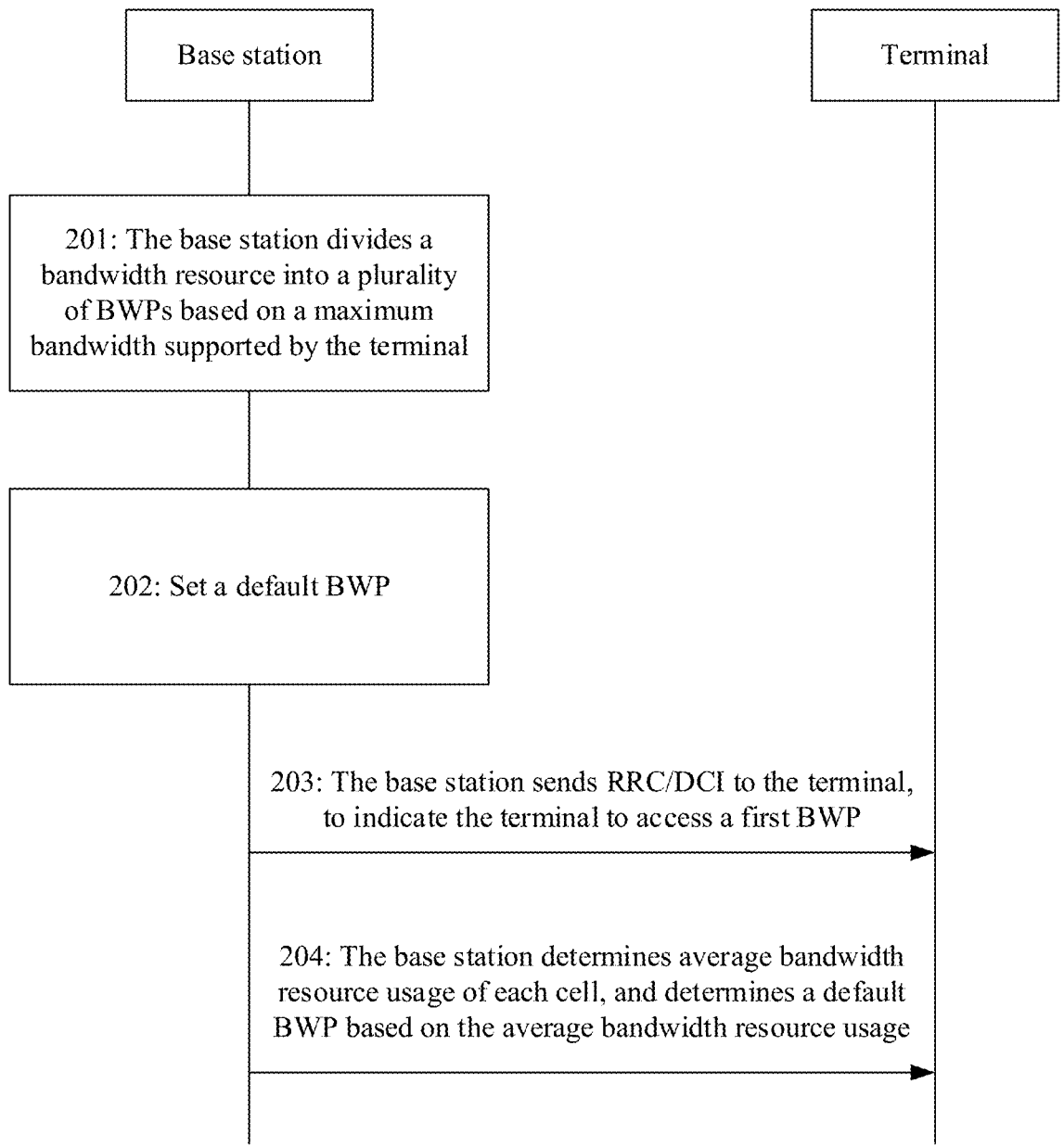
FIG. 4 is a schematic flowchart 2 of a BWP allocation method according to an embodiment of this application.

With reference to FIG. 1, FIG. 4 is a schematic flowchart of a BWP allocation method according to an embodiment of this application. FIG. 4 shows the following operations.

Operation 201: A base station divides a bandwidth resource into a plurality of BWPs based on a maximum bandwidth supported by a terminal.

For details about the division, refer to operation 101 in the scenario 1. Details are not described herein again.

Operation 202: Set a default BWP.

In this embodiment, during the division, the base station may allocate a corresponding default BWP to each terminal, so that the terminal automatically switches to the default BWP for operating when the terminal determines that the terminal needs to enter a power saving mode. Still using the division rule in the scenario 1 as an example, if a bandwidth resource of a current cell is 100 MHz and the maximum bandwidth supported by the terminal is 50 MHz, the base station may divide the 100 MHz into two BWPs, and each BWP corresponds to 50 MHz. In this embodiment, the base station further needs to pre-designate a corresponding default BWP for the terminal.

Operations of setting the default BWP may include:

First, the base station detects, based on access time information of the terminal, whether a corresponding default BWP is stored locally. Default BWPs on the base station may be stored based on time periods. For example, a default BWP corresponding to 8:00-12:00 is 30 MHz, and a default BWP corresponding to 1:00-5:00 is 10 MHz.

If the base station detects that a default BWP for a corresponding time period is not stored locally, the base station sets the default BWP for the terminal to a default value. It should be noted that, in this embodiment of this application, the base station may update, based on an actual bandwidth resource usage status of the terminal in each time period, a default BWP corresponding to each time period, and send an updated default BWP to the terminal by using an RRC/DCI message. An operation of updating the default BWP is described in detail in the following embodiment.

Operation 203: The base station sends an RRC/DCI message to the terminal, to indicate the terminal to access a first BWP.

For details about this operation, refer to the scenario 1. Details are not described herein. A difference from the scenario 1 lies in that the RRC/DCI message carries identification information of the default BWP and a timer in addition to identification information of the first BWP. The identification information of the default BWP includes but is not limited to location information of the default BWP in the bandwidth resource and a resource size. A specific function of the timer is described in detail in the following embodiment.

Operation 204: The base station determines average bandwidth resource usage of each cell, and determines a default BWP based on the average bandwidth resource usage.

Specifically, in this embodiment of this application, the base station may periodically obtain an actual bandwidth resource usage status of each terminal in each cell, and collect statistics on an actual bandwidth resource usage status of each terminal in each cell in each time period. For example, the base station obtains an actual bandwidth resource usage status of each terminal in a cell A every 20 minutes. Then the base station may calculate, based on the obtained actual bandwidth resource usage status, a sum of bandwidth resources used by all users in a time period, for example, 8:00 to 12:00, and then calculate an average value to obtain average bandwidth usage of each terminal in the cell A at 8:00 to 12:00.

Then the base station sets a default BWP based on the obtained average bandwidth resource usage. In an embodiment, a size of the default BWP may be greater than or equal to the average bandwidth resource usage, for example, 30 MHz. In this case, 30 MHz is the default BWP of the cell A in the time period of 8:00 to 12:00.

Because an average value of each cell in each time period may vary, the base station then updates the default BWP every day.

In this embodiment of this application, the base station updates default BWPs of all terminals in a cell by using an RRC/DCI message at an arrival moment of each time period.

For example, a default BWP record table on the base station for the cell A records the following: A bandwidth resource size of a default BWP corresponding to 8:00 to 12:00 is 20 MHz, and a bandwidth resource size of a default BWP corresponding to 17:00 to 22:00 is 30 MHz. Assuming that a terminal 1 (a maximum bandwidth supported by the terminal 1 is 50 MHz) accesses the cell A at 9:00, the base station detects that a default BWP corresponding to a current time period has a bandwidth resource size of 20 MHz. The base station first divides a current bandwidth resource based on the maximum bandwidth supported by the terminal 1, for example, divides a 200 MHz bandwidth resource into four BWPs, and each BWP corresponds to 50 MHz. Then the base station allocates a part of bandwidth in the bandwidth resource to the terminal 1 as a default BWP. Specifically, as described above, the base station sets a bandwidth of the default BWP to 20 MHz based on the current time period. Then the base station indicates, by using an RRC/DCI message, the terminal 1 to access a BWP 1 in the four BWPs. The RRC/DCI message further indicates a starting location of the default BWP in a frequency-domain resource and that a bandwidth size of the default BWP is 20 MHz. To be specific, when the terminal 1 needs to switch to a default BWP, the base station may indicate, by using the RRC/DCI message, the terminal 1 to switch to a default BWP with a bandwidth size of 20 MHz.

Then the terminal 1 operates in the BWP 1 according to the indication, and the terminal 1 stores related information of the default BWP (the related information includes but is not limited to the bandwidth resource size corresponding to the default BWP and a frequency-domain location of the default BWP). If the terminal 1 detects expiration of the timer at 10:00 (when the terminal 1 detects that traffic exists on the terminal, the timer is always reset, or when the terminal 1 detects that there is no service or an average service volume is less than a service volume threshold (the threshold may be set), the timer starts to perform timing, and duration of the timer may be set based on an actual case, and is not limited in this application), the terminal 1 operates in the default BWP, that is, 20 MHz, so that a high-bandwidth terminal does not need to always operate at a maximum bandwidth, thereby saving power, extending a standby time of the terminal, and improving user experience.

Scenario 3

Figure 5:
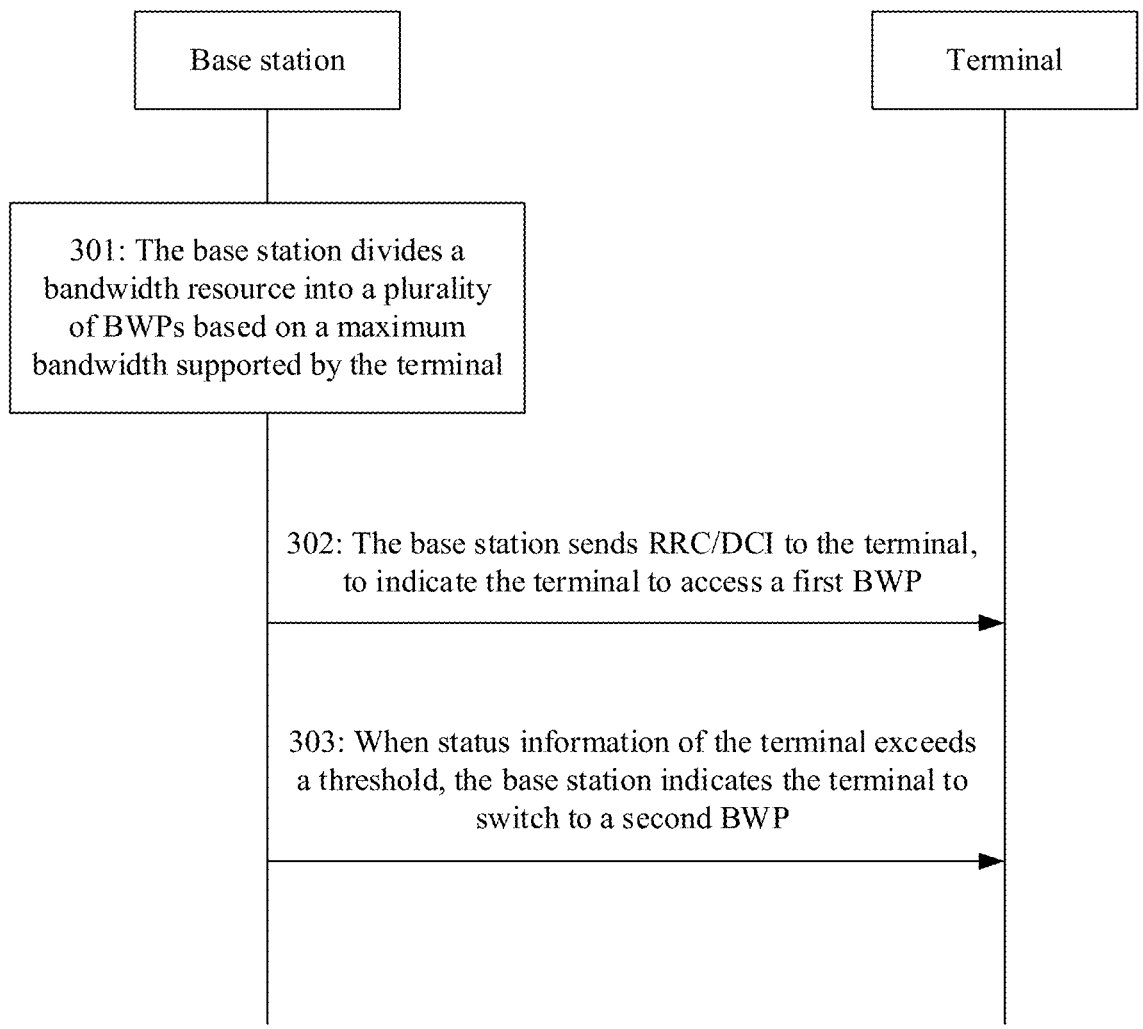
FIG. 5 is a schematic flowchart 3 of a BWP allocation method according to an embodiment of this application.

With reference to FIG. 1, FIG. 5 is a schematic flowchart of a BWP allocation method according to an embodiment of this application. FIG. 5 shows the following operations.

Operation 301: A base station divides a bandwidth resource into a plurality of BWPs (the plurality of BWPs are at least two BWPs) based on a maximum bandwidth supported by a terminal.

Specifically, in an embodiment, after a terminal accesses a cell, a base station to which the cell belongs may obtain a maximum bandwidth supported by the terminal, that is, the maximum bandwidth supported by the terminal, and divide a bandwidth resource based on the maximum bandwidth supported by the terminal. For details about the division, refer to operation 101 in the scenario 1. Details are not described herein again. A difference from operation 101 in the scenario 1 lies in that, when the base station divides the bandwidth resource, in this embodiment, in addition to considering a size of each BWP, attribute information of each BWP further needs to be set. The attribute information includes but is not limited to a subcarrier spacing (SCS) and a cyclic prefix (CP).

A specific rule for setting a BWP may be as follows:

(1) The base station sets same attribute information for each BWP obtained through division, that is, each BWP has a same SCS size and a same CP length.

(2) The base station may set different attribute information for each BWP based on an actual case. It should be noted that, when a current service of the terminal is a small-packet service, that is, each service occupies a comparatively small bandwidth resource, a comparatively high delay requirement is imposed, and therefore a comparatively large SCS value is required. When the terminal encounters a delay spread, a CP with a comparatively large length is required to deal with the delay spread effect and reduce interference. When the terminal moves at a high speed, the terminal encounters Doppler spread, and therefore a comparatively large SCS value is required; or when the terminal moves at a low speed, a comparatively small SCS value is required. Therefore, for different statuses of the terminal, the base station may preset attribute information for each BWP obtained through division, so that the base station may switch the terminal to an appropriate BWP based on obtained status information of the terminal in a subsequent process.

For example, a 200 MHz bandwidth resource is divided into four BWPs, an SCS and a CP of a BWP 1 are default values, an SCS of a BWP 2 is comparatively small but a CP is still a default value, an SCS of a BWP 3 is comparatively large and a CP is still a default value, and a CP of a BWP 4 is comparatively large but an SCS is comparatively small.

Operation 302: The base station sends an RRC/DCI message to the terminal, to indicate the terminal to operate in a first BWP.

For the case in the rule (1), the base station may indicate the terminal to operate in a default BWP. For details, refer to the scenario 1.

For the case in the rule (2), the base station may select a corresponding BWP for the terminal based on a current status of the terminal. For example, if the terminal is in a high-speed moving state, the base station may indicate the terminal to access the BWP 3 in the example in the rule (2).

Operation 303: When status information of the terminal exceeds a threshold, the base station indicates the terminal to switch to a second BWP.

Specifically, in this embodiment of this application, the base station periodically obtains the status information of the terminal, to monitor whether the status information of the terminal changes. In an embodiment, the base station may obtain information such as a speed, a delay spread, and a service type of the terminal by using a reference signal sent by the terminal. For a specific obtaining manner, refer to embodiments in the prior art. Details are not described in this application.

In an embodiment, when the BWP setting rule (1) is used, if the base station detects that the status information of the terminal changes, the base station re-divides the bandwidth resource; sets corresponding attribute information for each BWP obtained through division, where a size of the BWP obtained through division may be equal to or unequal to that of a previous time (that is, a division status in a previous period); sets attribute information for one BWP based on current status information of the terminal; and indicates, by using an RRC/DCI message, the terminal to operate in the BWP.

The following describes in detail different types of status information by using examples.

(1) Moving Speed

Specifically, for the moving speed, the base station may compare obtained speed information of the terminal with a first status threshold, and if the obtained speed information of the terminal exceeds the first status threshold, may determine that the current terminal is a terminal moving at a high speed. It can be learned from the foregoing that a terminal moving at a high speed requires a larger SCS, to resist interference caused by a frequency offset. For example, an initial division rule is as follows: A 200 MHz bandwidth resource is divided into four BWPs based on a maximum bandwidth (50 MHz) supported by a terminal, and each BWP corresponds to 50 MHz. In addition, according to the scenario in 1.1.1, the BWPs correspond to same attribute information: both the SCS and the CP are initial values, and a terminal 1 operates in a BWP 1. At an arrival moment of a period, if the base station detects that the terminal is currently in a high-speed moving state, the base station may re-divide the 200 MHz bandwidth resource into four BWPs, where each BWP corresponds to 50 MHz, increase an SCS of a BWP 2, and still retain a default value of a CP of the BWP 2. Then the base station sends an RRC/DCI message to the terminal 1, to indicate the terminal 1 to operate in the BWP 2.

(2) Delay Spread

Specifically, for the delay spread, the base station may compare obtained delay spread information of the terminal with a second status threshold, and if the obtained delay spread information of the terminal exceeds the second status threshold, may determine that the current terminal encounters a comparatively large delay spread. It can be learned from the foregoing that a terminal encountering a comparatively large delay spread requires a larger CP. For example, an initial division rule is the same as that described above, and details are not described herein again. At an arrival moment of a period, if the base station detects that the terminal currently encounters a comparatively large delay spread, the base station may re-divide the 200 MHz bandwidth resource into four BWPs, where each BWP corresponds to 50 MHz, reduce an SCS of a BWP 2, and increase a CP of the BWP 2. Then the base station sends an RRC/DCI message to the terminal 1, to indicate the terminal 1 to operate in the BWP 2.

(3) Service Type (a Service Type is a Size of a Service Packet of the Terminal, Including a Large-Packet Service Type and a Small-Packet Service Type)

Specifically, for the service type, the base station may compare an obtained service type of the terminal with a third status threshold, and if the obtained service type of the terminal exceeds the third status threshold, may determine that a current service of the terminal is a small-packet service. It can be learned from the foregoing that, for a small-packet service, the terminal requires a larger SCS. For example, an initial division rule is as follows: A 200 MHz bandwidth resource is divided into four BWPs based on a maximum bandwidth (50 MHz) supported by a terminal, and each BWP corresponds to 50 MHz. In addition, according to the scenario in the rule (1), the BWPs correspond to same attribute information: both the SCS and the CP are initial values, and a terminal 1 operates in a BWP 1. At an arrival moment of a period, if the base station detects that a current service of the terminal is a small-packet service, the base station may re-divide the 200 MHz bandwidth resource into four BWPs, where each BWP corresponds to 50 MHz, increase an SCS of a BWP 2, and still retain a default value of a CP of the BWP 2. Then the base station sends an RRC/DCI message to the terminal 1, to indicate the terminal 1 to operate in the BWP 2.

It should be noted that an example in which a switched BWP is the BWP 2 is used in the foregoing descriptions merely to better describe a "switching action". In this embodiment of this application, because frequency-domain multiplexing is supported, the base station may change attribute information of the BWP 1 in which the terminal originally operates, to implement BWP switching at a same frequency-domain location.

In another embodiment, when the BWP setting rule (2) is used, if the base station detects that the status information of the terminal changes, the base station indicates, by using an RRC/DCI message, the terminal to operate in a BWP with appropriate attribute information. If BWPs obtained through division do not include a BWP with appropriate attribute information, the base station may obtain BWPs through re-division, and set appropriate attribute information.

To sum up, in this embodiment of this application, the terminal can switch to a BWP with appropriate attribute information based on different statuses of the terminal, to improve service processing performance of the terminal, and further improve user experience.

Figure 6:
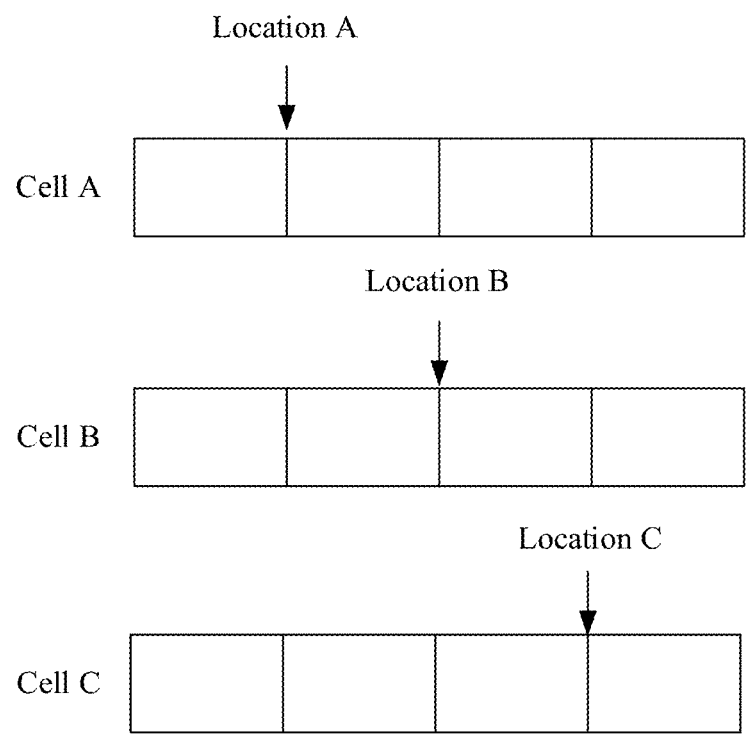
FIG. 6 is a schematic diagram of allocating a starting location of a BWP in a cell according to an embodiment of this application.

In addition, in this embodiment of this application, for the "BWP division" stage in the scenarios 1 to 3, the base station may further adjust an initial operating BWP of a terminal in each cell, to achieve frequency-domain staggering, to reduce inter-cell interference in a low-load time period of a system (actual bandwidth usage of all cells is less than a threshold, and the threshold may be set according to an actual requirement, for example, set to 10%). For example, FIG. 6 is a schematic diagram of allocating a starting location of a BWP in a cell. Bandwidth resources of cells A, B, and C are all 200 MHz. In this case, the base station may specify that all terminals in the cell A operate in a BWP to which a location A shown in FIG. 6 belongs when accessing the cell A; specify that all terminals in the cell B operate in a BWP to which a location B shown in FIG. 5 belongs when accessing the cell B; and specify that all terminals in the cell C operate in a BWP to which a location C shown in the figure belongs when accessing the cell C. "Belonging" means that the terminal operates in a BWP that includes the location, and a BWP to which a starting location point belongs is a default BWP in an initial BWP division stage in the scenarios 1 to 3. For example, a cell B has a 200 MHz bandwidth resource, and a terminal 1 and a terminal 2 support a 10 MHz bandwidth resource and a 20 MHz bandwidth resource respectively. For the terminal 1, the base station divides the 200 MHz into 20 BWPs, and each BWP corresponds to 10 MHz. Assuming that the location B is included in a BWP 10, the base station indicates the terminal 1 to access the BWP 10. For the terminal 2, the base station divides the 200 MHz into 10 BWPs, and each BWP corresponds to 20 MHz. The location B is included in a BWP 5, and the base station indicates the terminal 1 to access the BWP 5. If a starting location point falls between two BWPs, a BWP following the starting location point is selected as a corresponding BWP.

The foregoing describes the solutions provided in the embodiments of this application mainly from a perspective of interaction between network elements. It can be understood that, to implement the foregoing functions, a communications apparatus includes corresponding hardware structures and/or software modules for performing the functions. A person of ordinary skill in the art should easily be aware that, in combination with the examples described in the embodiments disclosed in this specification, units, algorithms, and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, function modules of the communications apparatus may be obtained through division based on the foregoing method examples. For example, the function modules may be obtained through division based on the functions, or at least two functions may be integrated in one processing module. The integrated module may be implemented in a form of hardware, or may be implemented in a form of a software function module. It should be noted that, in this embodiment of this application, division into modules is exemplary, and is merely a logical function division. In actual implementation, another division manner may be used.

Figure 7:
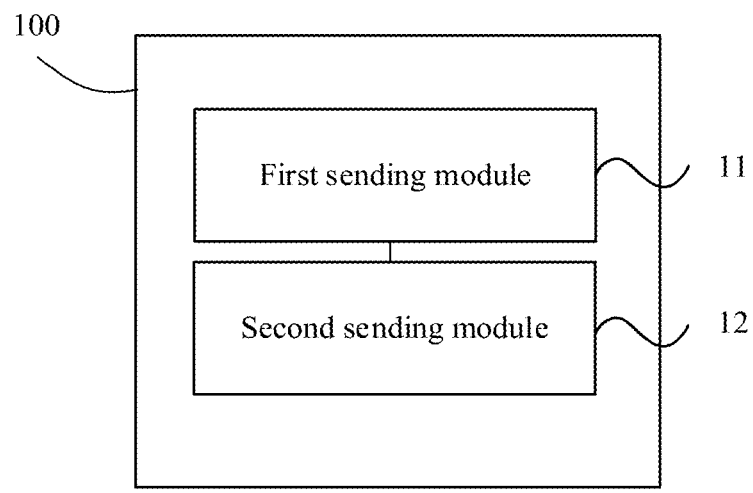
FIG. 7 is a schematic block diagram 1 of a communications apparatus according to an embodiment of this application.

When the function modules are obtained through division based on the functions, FIG. 7 is a possible schematic structural diagram of a communications apparatus 100 in the foregoing embodiment. As shown in FIG. 7, the communications apparatus may include a first sending module 11 and a second sending module 12. The first sending module 11 may be configured to perform the operation of "sending first indication information to a first terminal". For example, the module may be configured to support a BWP allocation apparatus in performing operation 102 in the foregoing method embodiment. The second sending module 12 may be configured to perform the operation of "sending second indication information to the first terminal when load of a first BWP exceeds a load threshold". For example, the module may be configured to support the communications apparatus in performing operation 103 in the foregoing method embodiment.

Figure 8:
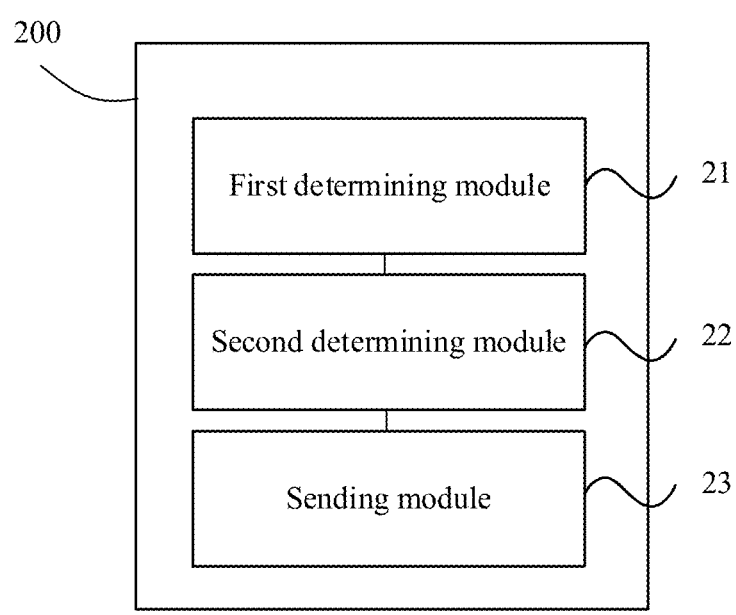
FIG. 8 is a schematic block diagram 2 of a communications apparatus according to an embodiment of this application.

FIG. 8 is another possible schematic structural diagram of a communications apparatus 200 in the foregoing embodiment. As shown in FIG. 8, the communications apparatus may include a first determining module 21, a second determining module 22, and a sending module 23. The first determining module 21 may be configured to perform the operation of "determining average bandwidth resource usage of one or more terminals accessing a first cell in a first time period". For example, the module may be configured to support the communications apparatus in performing operation 204 in the foregoing method embodiment. The second determining module 22 may be configured to perform the operation of "determining a size of the first BWP based on the average bandwidth resource usage". For example, the module may be configured to support the communications apparatus in performing operation 204 in the foregoing method embodiment. The sending module 23 may be configured to perform the operation of "sending, in the first time period, first indication information to a first terminal accessing the first cell, where the first indication information is used to indicate the first terminal to operate in the first BWP". For example, the module may be configured to support the communications apparatus in performing operation 203 in the foregoing method embodiment.

Figure 9:
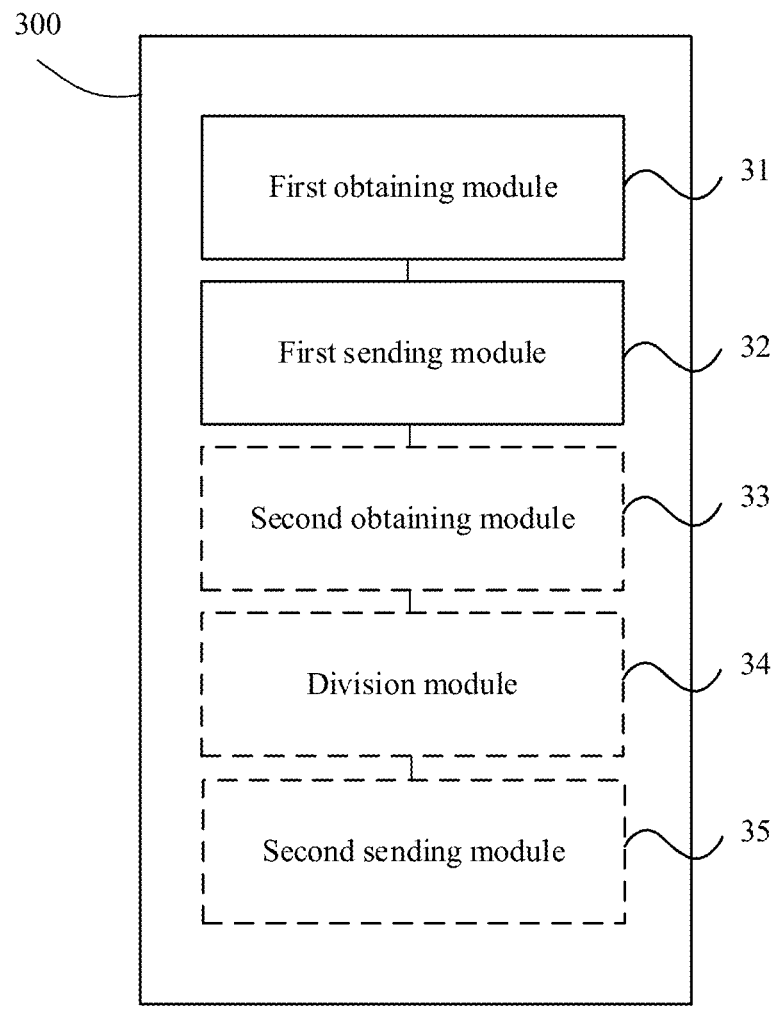
FIG. 9 is a schematic block diagram 3 of a communications apparatus according to an embodiment of this application.

FIG. 9 is still another possible schematic structural diagram of a communications apparatus 300 in the foregoing embodiment. As shown in FIG. 9, the communications apparatus may include a first obtaining module 31 and a first sending module 32. The first obtaining module 31 may be configured to perform the operation of "obtaining status information of a terminal accessing a first cell". For example, the module may be configured to support the communications apparatus in performing operation 303 in the foregoing method embodiment. The first sending module 32 may be configured to perform the operation of "sending first indication information to the terminal when the status information exceeds a status threshold". For example, the module may be configured to support the communications apparatus in performing operation 303 in the foregoing method embodiment. The apparatus may further include: a second obtaining module 33, where the module may be configured to support the communications apparatus in performing the operation of "obtaining bandwidth information of the terminal" in the foregoing method embodiment; a division module 34, which may be configured to support the communications apparatus in performing the operation of "BWP division" in the foregoing method embodiment; and a second sending module 35, which may be configured to support the communications apparatus in performing the operation of "sending second indication information to the terminal" in the foregoing method embodiment.

In the embodiments of this application, the communications apparatus 100, the communications apparatus 200, and/or the communications apparatus 300 may be used in a base station or a chip in a base station.

Figure 10:
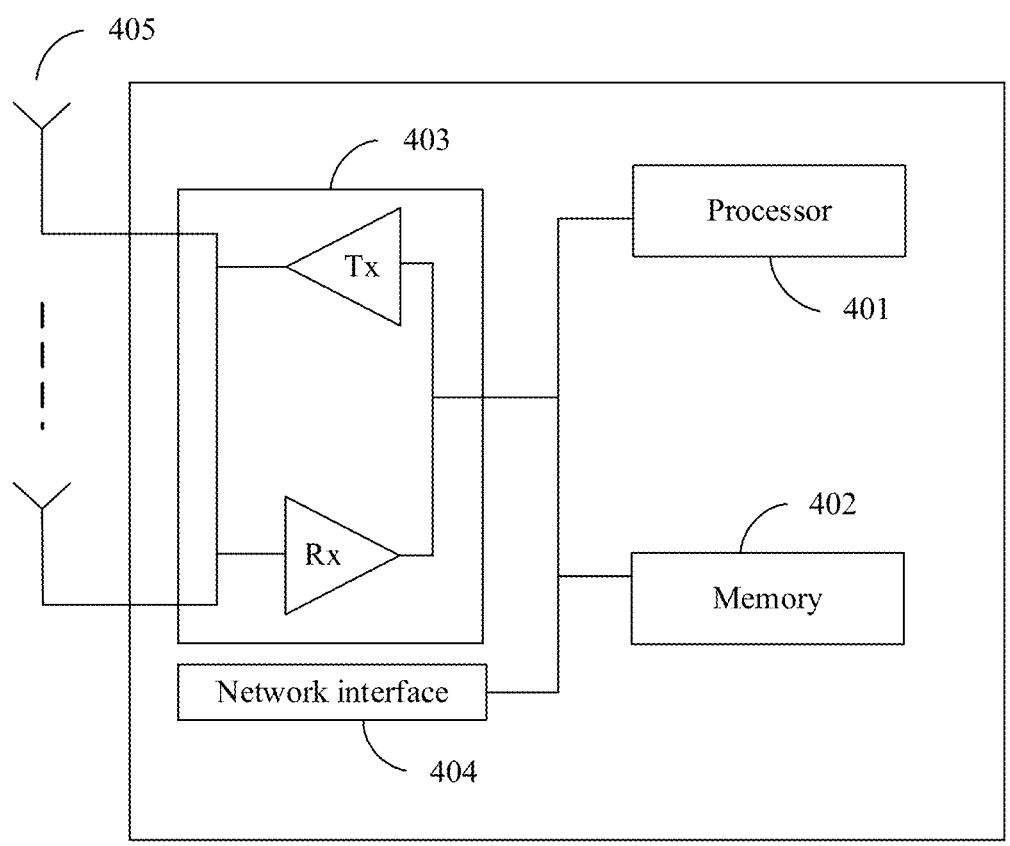
FIG. 10 is a schematic structural diagram of a base station according to an embodiment of this application.

In another example, FIG. 10 is a schematic structural diagram of a base station 400.

The base station 400 includes at least one processor 401, at least one memory 402, at least one transceiver 403, at least one network interface 404, and one or more antennas 405. The processor 401, the memory 402, the transceiver 403, and the network interface 404 are connected, for example, by using a bus. The antenna 405 is connected to the transceiver 403. The network interface 404 is configured to enable an access network device to be connected to another communications device by using a communications link. In this embodiment of this application, the connections may include various types of interfaces, transmission lines, buses, or the like. This is not limited in this embodiment.

In this embodiment of this application, the processor such as the processor 401 may include at least one of the following types: a general-purpose central processing unit (CPU), a digital signal processor (DSP), a microprocessor, an application-specific integrated circuit application-specific integrated circuit (ASIC), a microcontroller unit (MCU), a field programmable gate array (FPGA), or an integrated circuit configured to implement a logical operation. For example, the processor 401 may be a single-core (single-CPU) processor or a multi-core (multi-CPU) processor. The at least one processor 401 may be integrated into one chip or located on a plurality of different chips.

In this embodiment of this application, the memory such as the memory 402 may include at least one of the following types: a read-only memory (ROM), another type of static storage device that can store static information and an instruction, a random access memory (RAM), or another type of dynamic storage device that can store information and an instruction, or may be an electrically erasable programmable read-only memory (EEPROM). In some scenarios, the memory may alternatively be a compact disc read-only memory (CD-ROM), other compact disc storage, optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of an instruction or a data structure and that can be accessed by a computer. However, the memory is not limited herein.

The memory 402 may exist independently, and be connected to the processor 401. In an embodiment, the memory 402 and the processor 401 may alternatively be integrated, for example, integrated into a chip. The memory 402 can store program code for performing the technical solutions in the embodiments of this application, and the processor 401 controls execution of the program code. Various types of executed computer program code may also be considered as drivers of the processor 401. For example, the processor 401 is configured to execute the computer program code stored in the memory 402, to implement the technical solutions in the embodiments of this application.

The transceiver 403 may be configured to support receiving or sending of a radio frequency signal between the access network device and a terminal, and the transceiver 403 may be connected to the antenna 405. The transceiver 403 includes a transmitter Tx and a receiver Rx. Specifically, the one or more antennas 405 may receive a radio frequency signal. The receiver Rx in the transceiver 403 is configured to: receive the radio frequency signal from the antenna, convert the radio frequency signal into a digital baseband signal or a digital intermediate frequency signal, and provide the digital baseband signal or the digital intermediate frequency signal for the processor 401, so that the processor 401 further processes the digital baseband signal or the digital intermediate frequency signal, for example, performs demodulation processing and decoding processing. In addition, the transmitter Tx in the transceiver 403 is further configured to: receive a modulated digital baseband signal or digital intermediate frequency signal from the processor 401, convert the modulated digital baseband signal or digital intermediate frequency signal into a radio frequency signal, and send the radio frequency signal through the one or more antennas 405. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

It should be understood that, the base station 400 in this embodiment of this application may correspond to the base stations in the methods in the foregoing embodiments, and the foregoing and other management operations and/or functions of the elements in the base station 400 are separately used to implement corresponding operations of the foregoing methods. For brevity, details are not described herein again.

All related content of the operations in the foregoing method embodiments may be cited in function descriptions of the corresponding function modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by the base station, to control the base station to implement the foregoing method embodiments.

Based on a same technical concept, an embodiment of this application further provides a computer program. When the computer program is executed by a base station, the computer program is used to implement the foregoing method embodiments.

The program may be all or partially stored in a storage medium that is encapsulated with a processor, or may be all or partially stored in a memory that is not encapsulated with a processor.

Based on a same technical concept, an embodiment of this application further provides a processor. The processor is configured to implement the foregoing method embodiments. The processor may be a chip.

A person skilled in the art should be aware that in the foregoing one or more examples, functions described in the embodiments of this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any usable medium accessible to a general-purpose or special-purpose computer.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A bandwidth part (BWP) allocation method, comprising:
   sending first indication information to a first terminal, wherein the first indication information indicates that the first terminal is to operate in a first BWP;
   determining that a load of the first BWP exceeds a load threshold from first load information of the first BWP;
   in response to determining that the load of the first BWP exceeds the load threshold, determining that the first terminal has a switching priority that is higher than a priority threshold; and
   sending second indication information to the first terminal, wherein the second indication information indicates that the first terminal is to operate in a second BWP, wherein a load of the second BWP is less than the load of the first BWP.

2. The method according to claim 1, wherein the first load information comprises a quantity of terminals operating in one or more of first BWP or resource block (RB) usage of the first BWP.

3. The method according to claim 2, wherein before the sending of the first indication information to the first terminal, the method further comprises:
   obtaining bandwidth information of the first terminal, wherein the bandwidth information indicates a maximum bandwidth supported by the first terminal;
   wherein each of the first BWP and the second BWP is less than or equal to the maximum bandwidth supported by the first terminal.

4. The method according to claim 3, wherein the first terminal is one of one or more terminals operating in the first BWP.

5. The method according to claim 4, wherein
   the switching priority indicates bandwidth information of each terminal.

6. The method according to claim 3, wherein sending the second indication information to the first terminal comprises:

determining average RB usage of the first terminal;
determining that the average RB usage of the first terminal is less than an average RB usage threshold; and
sending the second indication information to the first terminal.

7. The method according to claim 1, wherein a starting location of the first BWP in a bandwidth resource of a first cell is different from a starting location of a BWP in which a terminal accessing a second cell operates, wherein the BWP is in a bandwidth resource of the second cell.

8. An apparatus for a base station, comprising:
at least one processor; and
a memory coupled to the at least one processor and storing program instructions for execution by the at least one processor, wherein the program instructions, when executed by the at least one processor, instruct the at least one processor to perform operations comprising:
sending first indication information to a first terminal, wherein the first indication information indicates that the first terminal is to operate in a first BWP;
determining that a load of the first BWP exceeds a load threshold from first load information of the first BWP;
in response to determining that the load of the first BWP exceeds the load threshold, determining that the first terminal has a switching priority that is higher than a priority threshold; and
sending second indication information to the first terminal, wherein the second indication information indicates that the first terminal is to operate in a second BWP, wherein a load of the second BWP is less than the load of the first BWP.

9. The apparatus according to claim 8, wherein the first load information comprises a quantity of terminals operating in one or more of the first BWP or resource block (RB) usage of the first BWP.

10. The apparatus according to claim 9, the operations further comprising:
before the sending of the first indication information to the first terminal, obtaining bandwidth information of the first terminal, wherein the bandwidth information indicates a maximum bandwidth supported by the first terminal; and
wherein each of the first BWP and the second BWP is less than or equal to the maximum bandwidth supported by the first terminal.

11. The apparatus according to claim 10, wherein the first terminal is one of one or more terminals operating in the first BWP.

12. The apparatus according to claim 11, wherein
the switching priority indicates bandwidth information of each terminal.

13. The apparatus according to claim 10, wherein the sending of the second indication information to the first terminal comprises:
determining an average RB usage of the first terminal;
determining that the average RB usage of the first terminal is less than an average RB usage threshold; and
sending the second indication information to the first terminal.

14. The apparatus according to claim 8, wherein a starting location of the first BWP in a bandwidth resource of a first cell is different from a starting location of a BWP in which a terminal accessing a second cell operates, wherein the BWP is in a bandwidth resource of the second cell.

15. A non-transitory machine-readable computer storage medium that program instructions, which, when executed by at least one processor of an apparatus for a base station, cause the apparatus to perform operations comprising:
sending first indication information to a first terminal, wherein the first indication information indicates that the first terminal is to operate in a first BWP;
determining that a load of the first BWP exceeds a load threshold from first load information of the first BWP;
in response to determining that the load of the first BWP exceeds the load threshold, determining that the first terminal has a switching priority that is higher than a priority threshold; and
sending second indication information to the first terminal, wherein the second indication information indicates that the first terminal is to operate in a second BWP, wherein a load of the second BWP is less than the load of the first BWP.

16. The apparatus non-transitory machine-readable computer storage medium according to claim 15, wherein the first load information comprises a quantity of terminals operating in one or more of the first BWP or resource block (RB) usage of the first BWP.

17. The non-transitory machine-readable computer storage medium according to claim 16, the operations further comprising:
before the sending of the first indication information to the first terminal, obtaining bandwidth information of the first terminal, wherein the bandwidth information indicates a maximum bandwidth supported by the first terminal; and
wherein each of the first BWP and the second BWP is less than or equal to the maximum bandwidth supported by the first terminal.

18. The non-transitory machine-readable computer storage medium according to claim 17,
wherein the first terminal is one of one or more terminals operating in the first BWP.

19. The non-transitory machine-readable computer storage medium according to claim 18, wherein
the switching priority indicates bandwidth information of each terminal.

20. The non-transitory machine-readable computer storage medium according to claim 17, wherein the sending of the second indication information to the first terminal comprises:
determining average RB usage of the first terminal;
determining that the average RB usage of the first terminal is less than an average RB usage threshold; and
sending the second indication information to the first terminal.

* * * * *